April 25, 1961
A. DOERPER
2,981,390
TRANSMISSION CLUTCH SHIFT FACILITATION DEVICE
Filed March 31, 1958
3 Sheets-Sheet 1
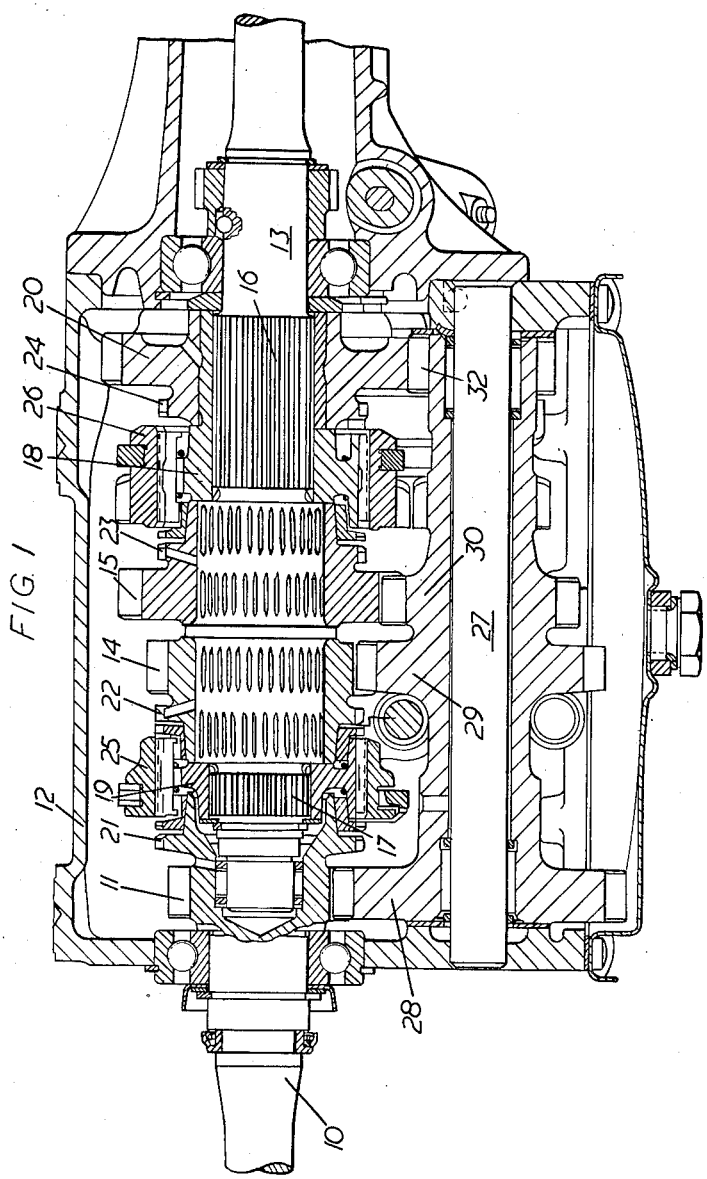
Inventor
Alfred Doerper
By W. C. Middleton
Attorney

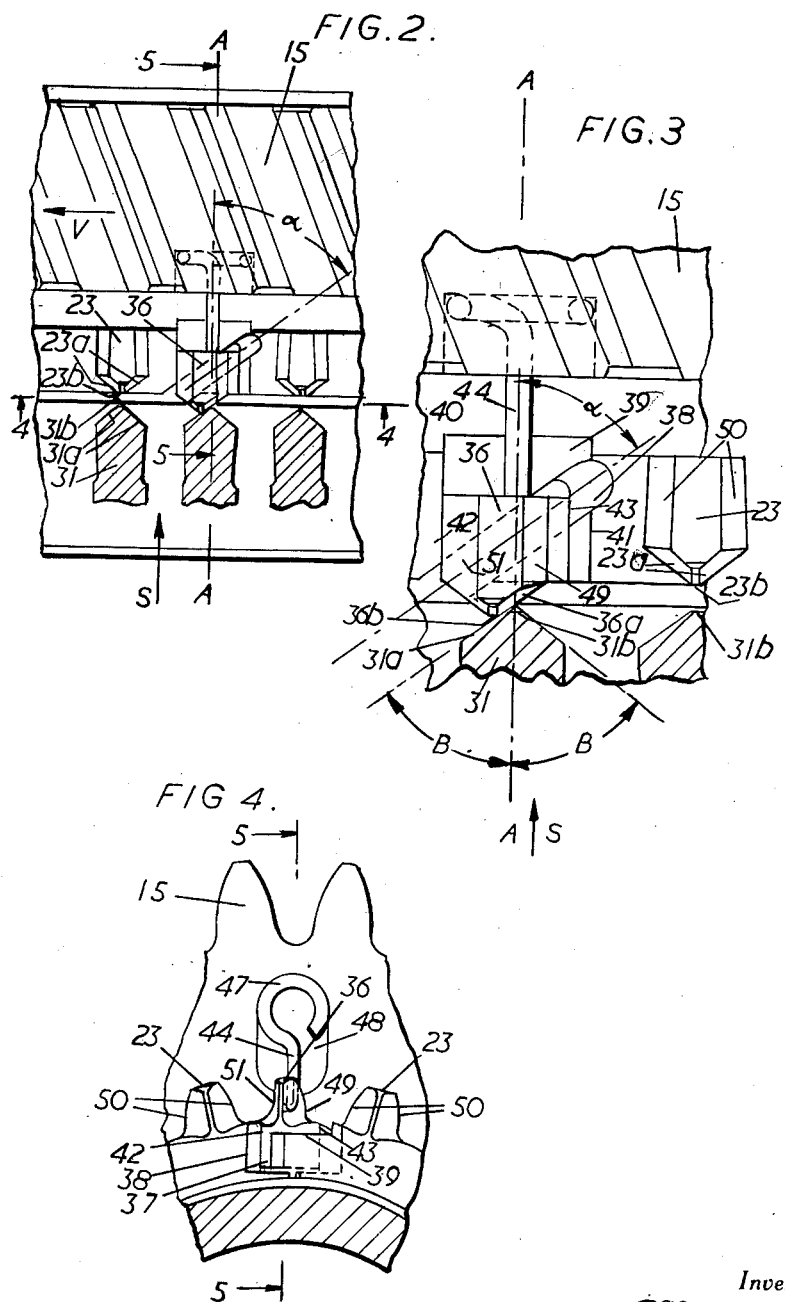

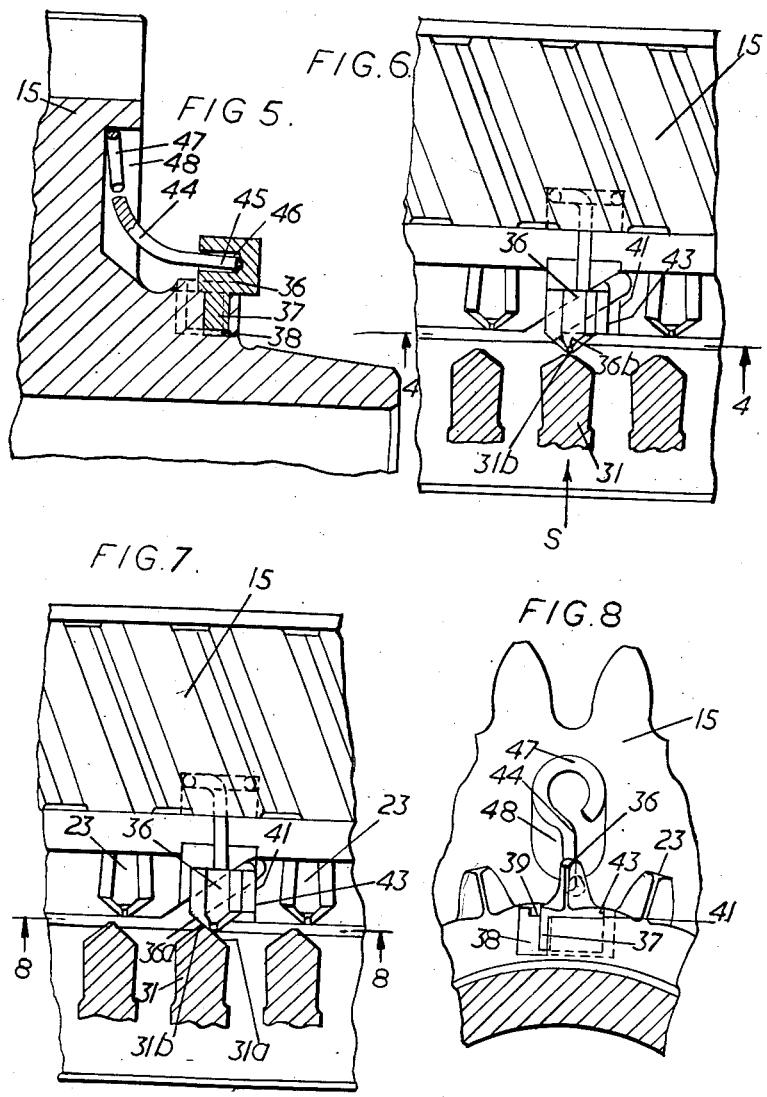

United States Patent Office 2,981,390
Patented Apr. 25, 1961

2,981,390
TRANSMISSION CLUTCH SHIFT FACILITATION DEVICE

Alfred Doerper, Ruesselsheim (Main), Hessen, Germany, assignor to General Motors Corporation, Detroit, Mich., a corporation of Delaware Filed Mar. 31, 1958, Ser. No. 725,197

Claims priority, application Germany Apr. 11, 1957

21 Claims. (Cl. 192—67)

This invention relates to change speed transmissions and in particular to such transmissions as incorporate a rotatable selective speed driving member and a coaxial slidable clutch driven member, the members having cooperating internal and external clutch teeth.

The ends of the clutch teeth are usually chamfered and during a shift at standstill the crests of the clutch teeth between the chamfered ends may be in alignment. In such a position the engagement of the clutch is not possible and it may be necessary to engage the engine clutch one or more times in order to reposition the driving member to allow clutch engagement.

An object of the invention is to overcome this difficulty and to facilitate clutch engagement.

Accordingly, a movable pilot tooth is substituted for one of the clutch teeth on one of the members and is resiliently urged to a normal position out of pitch with the remaining clutch teeth.

Another object of the invention is to provide a transmission device in which the pilot tooth in the normal position projects axially beyond the remaining clutch teeth. The teeth on the slidable member then contact first the pilot tooth which guides the clutch teeth into the tooth spaces of the other member.

Yet another object of the invention is to provide a transmission device in which the pilot tooth is guided by a tongue and slot arrangement to be movable at an angle to the direction of sliding engagement movement of the driven member.

A further object of the invention is to provide stop means to limit circumferential relative movement of the pilot tooth on its member.

The scope of the invention is defined by the appended claims; and how it can be carried into effect is hereinafter particularly described with reference to the accompanying drawings, in which:

Figure 1 is a longitudinal vertical cross section of a change-speed transmission incorporating the invention;

Figure 2 is a fragmentary view of a clutch in the transmission showing the parts in a critical crest-to-crest position;

Figure 3 is part of Figure 2 to an enlarged scale;

Figure 4 is a radial transverse cross section taken along the lines 4—4 of Figures 2 and 6;

Figure 5 is a longitudinal cross section taken along the line 5—5 of Figure 4;

Figure 6 is a view similar to Figure 2, but showing the parts in the pilot tooth crest-to-crest position;

Figure 7 is a view similar to Figures 2 and 6, but showing the parts after the pilot tooth has been moved from the position of Figure 6; and Figure 8 is a section similar to Figure 4 taken along the line 8—8 of Figure 7.

Referring to Figure 1, an input shaft 10 is integral with or rigidly connected to a main top-speed gear 11 and is carried by a conventional bearing fitted into the front wall of a case 12. A co-axial mainshaft 13 is piloted at its front end in a roller bearing in the clutch gear 11 and is supported in a mainshaft rear bearing in the case 12. Third and second speed gears 14 and 15 respectively, are freely and rotatably journalled on the mainshaft 13. The mainshaft 13 is also provided with two splined portions 16 and 17 on which hubs 18 and 19 of the second speed and third and top speed synchronising clutch assemblies are splined and retained against axial displacement. A first speed gear 20 is freely rotatable on the hub 18. The gears 11, 14, 15 and 20 are provided with clutch teeth 21, 22, 23, 24. Clutch sleeves 25 and 26 are slidingly engaged with external splines on the hubs 19 and 18, respectively. With this arrangement, the clutch sleeve 26 can be shifted into mesh either with the clutch teeth 24 on the first speed gear 20 or with the clutch teeth 23 on the second speed gear 15. The sleeve 25 can be meshed either with the clutch teeth 22 on the third speed gear 14 or with the clutch teeth 21 on the top speed gear 11. Synchronizer devices are inserted between the clutch sleeves 25 and 26 and the clutch teeth 21, 22 and 23. These synchronizer devices are conventional and are therefore not described in detail.

A countershaft 27 is secured in the case 12 and carries rotatably on needle bearings an assembly of gears 28, 29, 30 and 32. The gear 28 is in constant mesh with the gear 11, the gear 29 is in constant mesh with the third speed gear 14, the gear 30 is in constant mesh with the second speed gear 15 and the gear 32 is in constant mesh with the first speed gear 20.

The slidable clutch sleeve 26 has a series of internal axial teeth 31 (Figure 2) whose ends are chamfered at both sides at 31a. Between the end chamfers 31a of each tooth 31 is a crest 31b. The clutch teeth 23 have their ends, which are adjacent the chamfered ends of the teeth 31, chamfered at 23a and between the end chamfers 23a of each tooth 23 is a crest 23b. Each of the chamfered ends 23a and 31a lies at an angle $\beta$ to the longitudinal axis A of the second speed gear 15 and clutch sleeve 26. The synchronizer device has been omitted from Figures 2 to 8 of the drawings for the sake of simplicity, as they are not necessary for an understanding of the invention.

In order to engage second speed, the clutch sleeve 26 is moved towards the second speed gear 15, to bring the teeth 31 successively into engagement with the teeth of the synchronizer device and the clutch teeth 23 on the gear 15. Owing to the action of the synchronizer device the latter is made to rotate at the same speed as the sleeve 26, or is held stationary if the latter is stationary, and if the crests 23b and 31b of the teeth 23 and 31 are in alignment, there may be extreme difficulty in engaging second speed as the sleeve 26 and gear 15 must be relatively rotated slightly to allow the teeth 31 to pass between the teeth 23 but the synchronizer device acts to prevent such relative rotation.

According to the present invention, therefore, a resiliently mounted pilot tooth 36 is provided on the gear 15 in place of one of the teeth 23.

The pilot tooth 36 has a radially inwardly projecting guide tongue 37 (Figure 4) which is rectangular in radial cross-section (Figure 5) and substantially parallelogrammical in arcuate cross-section. The tongue 37 is a slidable fit in a parallel-sided guide slot 38 of rectangular radial cross-section, which is formed in the periphery of the second speed gear 15 in place of the missing tooth 23.

The axis of the slot 38 lies at an angle $\alpha$ to the axis A of the second speed gear 15. This angle $\alpha$ is approximately equal to the angle $\beta$, that is about 50°.

A second shallow slot 39, having parallel sides 40 and 41, is formed in the periphery of the gear 15 externally of the slot 38. Within the slot 39 is a base portion of the tooth 36 which has parallel sides 42 and 43 adapted to engage the sides 40 and 41 of the slot 39 to limit movement of the pilot tooth 36. The slot 39 is of such a size as to permit the base portion of the tooth 36 to move diagonally across the slot 39 guided by the tongue 37 in the slot 38 from an outer position in which the sides 40 and 42 engage to an inner position in which the sides 39 and 41 engage.

The body portion of the tooth 36 has some of the same features as the teeth 23. Thus adjacent the teeth 31, the tooth 36 is chamfered on both sides at 36a at the angle β and there is a crest 36b between the chamfered ends. The flanks 49 and 51 of the tooth 16 are not tapered as are the flanks 50 of the teeth 23 and the flanks of the ends of the teeth 31. The flank 51 is, however, cut away as shown in Figure 4 in order to leave as much space between the flank 51 and the adjacent flank 50 with the tooth in its outer position as between flanks 50 of adjacent teeth 23.

The pilot tooth 36 is urged into its outer position by the force of a spring 44 (Figure 5). The spring 44 comprises a bent piece of hardened steel wire, whose one end 45 extends substantially longitudinally and fits with clearance in a bore 46 in the body portion of the tooth 36. The other end 47 of the spring 44 extends substantially radially and is looped to fit in a recess 48 in an end face of the gear 15 adjacent the tooth 36. Due to its shape, the spring 44 urges the pilot tooth 36 radially inwardly so as at all times to hold the base portion of the tooth 36 in the slot 39.

In the outer position (Figure 3), the crest 36b of the pilot tooth 36 projects axially beyond the crests 23b of the clutch teeth 23 by a distance of between 75 and 160 thousandths of an inch, depending on the size of the clutch sleeve 26 and the pitch of the teeth 31. In the same outer position, the longitudinal axis of the pilot tooth 36 through the crest 36b is out of pitch with the longitudinal axes of the clutch teeth 23 through the crests 23b by a distance equal to the space between the walls 43 and 41. This space is the difference between the widths of the base portion of the tooth 36 between the walls 42 and 43 and of the slot 39 between the walls 40 and 41, and is between 50 and 100 thousandths of an inch.

In the inner position (Figure 7), the crest 36b of the pilot tooth 36 still projects axially slightly beyond the crests 23b of the clutch teeth 23 by a distance of between 25 and 75 thousandths of an inch, depending on the angle α and the distances of axial projection and out-of-pitch. In the same position the longitudinal axis of the pilot tooth 36 through the crest 36b is in pitch with the longitudinal axes of the clutch teeth 23 through the crests 23b.

In order to engage second speed at standstill, the clutch sleeve 26 is moved axially in the direction S. The clutch sleeve 26 cannot rotate as it is connected by the shaft 13 to the rear axle and wheels. While the engine clutch is disengaged for a speed change, however, the gear 15 can rotate.

Considering now the operation of the device in the critical position shown in Figures 2, 3 and 4, the crests 31b of the teeth 31 are aligned with the crests 23b of the teeth 23. Without the pilot tooth 36, it would be difficult or impossible to engage the desired speed, and it may be necessary to withdraw the sleeve 26 and to spin the gear 15 by re-engaging the engine clutch several times.

However by the employment of the pilot tooth 36 of the present invention, the left hand chamfered end 31a of a tooth 31, as viewed in Figure 2, engages the right hand chamfered end 36a of the tooth 36. As the sleeve 26 is pushed in the direction S to complete the speed change, the engaged chamfered ends 31a and 36a slide over each other and the tooth 31 cams the pilot tooth 36 out of its path. As the left hand side wall 42 of the tooth 36 abuts the left hand side wall 40 of the slot 39, this camming action is directly transferred to the gear 15 which is forced to move in the direction V. The teeth 23 being integral with the gear 15 also move relative to the sleeve 26 and the teeth 31 are enabled to pass between the teeth 23 as the crests 31b and 23b are no longer in alignment.

Disengagement of the clutch sleeve 26 from the teeth 23 is also readily achieved as the cutting away of the flank 51 of the tooth 36 permits a tooth 31 to pass freely between the flank 51 and the adjacent flank 50 even with the tooth 36 in its outer position.

In the event that the clutch sleeve 26 is moved in the direction S with the crest 36b of the pilot tooth 36 in alignment with crest 31b of a tooth 31 (Figure 6), the crests 36b and 31b engage and the pilot tooth 36 is pushed back towards the gear 15 against the spring 44 by further movement of the sleeve 26. During this retraction, however, the tongue 37 in the slot 38 guides the pilot tooth in an inclined path to remove the crest 36b from engagement with the crest 31b (Figure 7). This sideways and backwards movement of the tooth 36 continues until the walls 41 and 43 engage (Figure 8), in which position further movement of the tooth 36 relative to the gear 15 is prevented and the tooth 36 and gear 15 are together cammed in a direction opposite to the direction V until the right hand chamfered ends 31a of the teeth 31, as viewed in Figure 7, engage slidably with the left hand chamfered ends 23a of the teeth 23. Further relative rotation between the gear 15 and sleeve 26 to allow the teeth 31 to pass between the teeth 23 permits the pilot tooth 36 urged by the spring 44 and guided by the tongue 37 in the slot 38 to its initial outer position.

As will readily be understood the invention is applicable not only to sliding gear transmissions having synchronizer devices, but also to those without such synchronizer devices. In particular, the first speed gear 20 having clutch teeth 24 may be provided with a pilot tooth similar to the tooth 36 in place of one of the clutch teeth 24.

Whilst the angles α and β have been chosen as equal, the angle α may be made greater than the angle β. The spring 44 may take other forms than that shown and in particular may be secured rigidly to the tooth 36. In the latter case, the tongue 37 and slot 38 may be dispensed with.

The exact form of the pilot tooth 36 is also a matter of choice, so long as the essential camming action is provided upon the occurrence of a crest-to-crest condition of the teeth 23 and 31 and the resilient retraction is provided upon the occurrence of a crest-to-crest condition of the tooth 36 and a tooth 31.

While the embodiment of the invention shown in the drawings and described above constitutes a preferred embodiment, it will be understood that other embodiments may be adopted, such as fall within the scope of the appended claims.

I claim:

1. In a transmission device, a rotatable selective speed driving member and a coaxial slidable clutch driven member, one of said members having external clutch teeth and the other member having co-operating internal clutch teeth, only one of the clutch teeth on one of said members constituting a movable pilot tooth, means movably mounting said one of the clutch teeth on said one of said members for movement from a normal position out of pitch with the remaining clutch teeth to a position in pitch with the remaining clutch teeth, and biasing means to normally urge said one clutch tooth from said position in pitch to said normal position.

2. In a transmission device, a rotatable selective speed driving member and a coaxial slidable clutch driven member, one of said members having external clutch teeth and the other member having co-operating internal clutch teeth, only one of the clutch teeth on one of said members constituting a movable pilot tooth, means movably mounting said one of the clcutch teeth on said one of said members for movement from a normal position out of pitch with the remaining clutch teeth to a position in pitch with the remaining clutch teeth, biasing means to normally urge said one clutch tooth from said position in pitch to said normal position, and means on said pilot tooth and clutch teeth on the other of said members having cam surfaces for cooperation to cause relative rotation of the driving and driven members.

3. In a transmission device, a rotatable selective speed driving member and a coaxial slidable clutch driven member, one of said members having external clutch teeth and the other member having cooperating internal clutch teeth, only one of the clutch teeth on one of said members constituting a movable pilot tooth, means movably mounting said one of the clutch teeth on said one of said members for movement from a normal position out of pitch with the remaining clutch teeth to a position in pitch with the remaining clutch teeth, biasing means to normally urge said one clutch tooth from said position in pitch to said normal position, and pilot tooth projecting axially beyond the remaining clutch teeth toward said other member.

4. In a transmission device, a rotatable selective speed driving member and a coaxial slidable clutch driven member, one of said members having external clutch teeth and the other member having cooperating internal clutch teeth, only one of the clutch teeth on one of said members constituting a movable pilot tooth, means movably mounting said one of the clutch teeth on said one of said members for movement from a normal position out of pitch with the remaining clutch teeth to a position in pitch with the remaining clutch teeth, biasing means to normally urge said one clutch tooth from said position in pitch to said normal position, said pilot tooth projecting axially beyond the remaining clutch teeth toward said clutch teeth of the other member, and said pilot tooth having a cam surface for cooperation with a clutch tooth on the other of said members to cause relative rotation of the driving and driven members.

5. In a transmission device, a rotatable selective speed driving member and a coaxial slidable clutch driven member, one of said members having external clutch teeth and the other member having cooperating internal clutch teeth, only one of the clutch teeth on one of said members constituting a movable pilot tooth, means movably mounting said one of the clutch teeth on said one of said members for movement from a normal position out of pitch with the remaining clutch teeth to a position in pitch with the remaining clutch teeth, biasing means to normally urge said one clutch tooth from said position in pitch to said normal position, and means operative on said pilot tooth and said other member to move said pilot tooth against said biasing means to a position in pitch with the remaining clutch teeth on said one of said members.

6. In a transmission device, a rotatable selective speed driving member and a coaxial slidable clutch driven member, one of said members having external clutch teeth and the other member having cooperating internal clutch teeth, only one of the clutch teeth on one of said members constituting a movable pilot tooth, means movably mounting said one of the clutch teeth on said one of said members for movement from a normal position out of pitch with the remaining clutch teeth to a position in pitch with the remaining clutch teeth, biasing means to normally urge said one clutch tooth from said position in pitch to said normal position, wherein said pilot tooth is movable against said biasing means to a position in pitch with the remaining clutch teeth, and said pilot tooth having a cam surface for cooperation with a clutch tooth on the other of said members to cause relative rotation of the driving and driven members.

7. In a transmission device, a rotatable selective speed driving member and a coaxial slidable clutch driven member, one of said members having external clutch teeth and the other member having cooperating internal clutch teeth, only one of the clutch teeth on one of said members constituting a movable pilot tooth, means movably mounting said one of the clutch teeth on said one of said members for movement from a normal position out of pitch with the remaining clutch teeth to a position in pitch with the remaining clutch teeth, biasing means to normally urge said one clutch tooth from said position in pitch to said normal position, said pilot tooth projecting axially beyond the remaining clutch teeth toward said clutch teeth on the other member, wherein said pilot tooth is movable against said biasing means to a position in pitch with the remaining clutch teeth, said pilot tooth having a cam surface for cooperation with a clutch tooth on the other of said members to cause relative rotation of the driving and driven members.

8. In a transmission device, a rotatable selective speed driving member and a coaxial slidable clutch driven member, one of said members having external clutch teeth and the other member having cooperating internal clutch teeth, only one of the clutch teeth on one of said members constituting a movable pilot tooth, means movably mounting said one of the clutch teeth on said one of said members for movement from a normal position out of pitch with the remaining clutch teeth to a position in pitch with the remaining clutch teeth, biasing means to normally urge said one clutch tooth from said position in pitch to said normal position, means operatively connecting said pilot tooth and said other member to move said pilot tooth against said biasing means to a position in pitch with the remaining clutch teeth, in which latter position said pilot tooth projects slightly beyond the remaining clutch teeth.

9. In a transmission device, a rotatable selective speed driving member and a coaxial slidable clutch driven member, one of said members having external clutch teeth and the other member having cooperating internal clutch teeth, only one of the clutch teeth on one of said members constituting a movable pilot tooth, means movably mounting said one of the clutch teeth on said one of said members for movement from a normal position out of pitch with the remaining clutch teeth to a position in pitch with the remaining clutch teeth, biasing means to normally urge said one clutch tooth from said position in pitch to said normal position, means operatively connecting said pilot tooth and said other member to move said pilot tooth against said biasing means to a position in pitch with the remaining clutch teeth, in which latter position said pilot tooth projects slightly beyond the remaining clutch teeth, and said last named means including means on said pilot tooth cooperating with a clutch tooth on the other of said members to cause relative rotation of the driving and driven members.

10. In a transmission device, a rotatable selective speed driving member and a coaxial slidable clutch driven member, one of said members having external clutch teeth and the other member having cooperating internal clutch teeth, only one of the clutch teeth on one of said members constituting a movable pilot tooth, means movably mounting said one of the clutch teeth on said one of said members for movement from a normal position out of pitch with and forward of the remaining clutch teeth to a position in pitch with the remaining clutch teeth, biasing means to normally urge said one clutch tooth from said position in pitch to said normal position, means operatively connecting said pilot tooth and said other member to move said pilot tooth against said biasing means to a position in pitch with the remaining clutch teeth, in which latter position said pilot tooth projects slightly beyond the remaining clutch teeth, and said last named means including means on said pilot tooth cooperating with a clutch tooth on the other of said members to cause relative rotation of the driving and driven members.

11. In a transmission device, a rotatable selective speed driving member and a coaxial slidable clutch driven member, one of said members having external clutch teeth and the other member having cooperating internal clutch teeth, resilient means to urge one of the clutch teeth constituting a movable pilot tooth on one of said members to a normal position out of pitch with the remaining clutch teeth, said resilient means acting to urge said pilot tooth radially inwardly.

12. In a transmission device, a rotatable selective speed driving member and a coaxial slidable clutch driven member, one of said members having external clutch teeth and the other member having cooperating internal clutch teeth, only one of the clutch teeth on one of said members constituting a movable pilot tooth, means movably mounting said one of the clutch teeth on said one of said members for movement from a normal position out of pitch with the remaining clutch teeth to a position in pitch with the remaining clutch teeth, biasing means to normally urge said one clutch tooth from said position in pitch to said normal position, the flank of the pilot tooth on the side nearest an adjacent clutch tooth in the normal position of the pilot tooth being cut away to leave a space at least equal to the space between adjacent clutch teeth of the other clutch teeth on said one of said members.

13. In a transmission device, a rotatable selective speed driving member and a coaxial slidable clutch driven member, external clutch teeth on one of said members, cooperating internal clutch teeth on the other of said members, only one of the clutch teeth constituting a movable pilot tooth on one of said members, a slot on said one of said members inclined at an angle to the direction of sliding engagement movement of said driven member, a tongue on said pilot tooth cooperating with said slot to mount said pilot tooth on said one of said members for movement in the direction of said slot, stop means to limit circumferential relative movement of said pilot tooth in said slot and resilient means to urge said pilot tooth to a normal position out of pitch with the remaining clutch teeth and in abutment with said stop means.

14. In a selective speed transmission device, a rotatable driving member and a coaxial clutch driven member, means mounting one of said members for axial sliding movement between a disengaged position and an engaged position, one of said members having a group of clutch teeth and the other having a cooperating group of clutch teeth having substantially the same pitch said groups of clutch teeth being relatively positioned on said members to be disengaged when said one of said members is in said disengaged position and to be engaged when said one of said members is in said engaged position, only one of the clutch teeth of one of said groups of clutch teeth constituting a movable pilot tooth, means mounting said movable pilot tooth for movement relative to the other teeth of said one of said groups of clutch teeth from a normal position out of pitch with respect to said other teeth of said one of said groups of clutch teeth to a position in pitch with said other teeth, and biasing means effective to move said pilot tooth from said position in pitch to said normal position when said members are disengaged and said pilot tooth being moved against said biasing means from said normal position to said position in pitch by a tooth of said other group of clutch teeth during movement of said one member from the disengaged to the engaged position.

15. In a selective speed transmission device, a rotatable driving member and a coaxial clutch driven member, means mounting one of said members for axial sliding movement between a disengaged position and an engaged position, one of said members having a group of clutch teeth and the other having a cooperating group of clutch teeth having substantially the same pitch, said groups of clutch teeth being relatively positioned on said members to be disengaged when said one of said members is in said disengaged position and to be engaged when said one of said members is in said engaged position, only one of the clutch teeth of one of said groups of clutch teeth constituting a movable pilot tooth, means mounting said movable pilot tooth for movement relative to the other teeth of said one of said groups of clutch teeth from a normal position out of pitch with respect to said other teeth of said one of said groups of clutch teeth and forward of said other teeth of said one of said groups of clutch teeth toward the other group of clutch teeth to a position in pitch with said other teeth and less forward of said other teeth and biasing means effective to move said pilot tooth from said position in pitch to said normal position when said members are disengaged and said pilot tooth being moved against said biasing means from said normal position to said position in pitch by a tooth of said other group of clutch teeth during movement of said one member from the disengaged to the engaged position.

16. In a transmission drive device, input clutch means rotatably mounted about an axis including a group of input clutch teeth located circumferentially about said axis, output clutch means rotatably mounted about said axis including a group of output clutch teeth located circumferentially about said axes, means mounting said input and output clutch means for relative axial movement between an engaged and a disengaged position, each of said groups of clutch teeth having leading edges aligned in a circle about said axis and having substantially the same pitch for simultaneous intermeshing engagement, said groups of clutch teeth being axially spaced from each other in said disengaged position of said input and output clutch means and relatively axially movable toward each other's leading edges and simultaneously into intermeshing engagement with each other in the engaged position of said input and output clutch means, only one of the clutch teeth of one of said groups of clutch teeth on one clutch means constituting a movable pilot tooth, means mounting said movable pilot tooth on said one clutch means for movement relative to the remaining teeth of said one group of clutch teeth from a normal position out of pitch with respect to said remaining teeth and axially forward of the leading edges of said remaining teeth toward the leading edge of said other group of teeth to a position in pitch with said remaining teeth and with the leading edge less forward of said remaining teeth, biasing means operable to move said pilot tooth to said normal position when said members are disengaged, and means operative between a tooth of said other group of clutch teeth and said pilot tooth to move said pilot tooth against said biasing means from said normal position to said position in pitch during relative axial movement of said groups of clutch teeth from the disengaged toward the engaged position to relatively rotate said groups of clutch teeth into aligned position for meshing engagement prior to meshing engagement.

17. In a transmission drive device, input clutch means rotatably mounted about an axis including a group of input clutch teeth located circumferentially about said axis, output clutch means rotatably mounted about said axis including a group of output clutch teeth located circumferentially about said axis, means mounting said input and output clutch means for relative axial movement between an engaged and a disengaged position, each of said groups of clutch teeth having leading edges aligned in a circle about said axis and having substantially the same pitch for simultaneous intermeshing engagement, said groups of clutch teeth being axially spaced from each other in said disengaged position of said input and output clutch means and relatively axially movable toward each other's leading edges and into simultaneous intermeshing engagement with each other in the engaged position of said input and output clutch means, a single pilot tooth on one clutch means, means mounting said single pilot tooth on said one clutch means for movement relative to the remaining teeth of said one group of clutch teeth from a normal position out of pitch with respect to said remaining teeth to a position in pitch with said remaining teeth, the other group of clutch teeth on said other member including intermeshing means, biasing means operable to move said pilot tooth to said normal position when said members are disengaged, and means operative between said single pilot tooth and said intermeshing means on the other member before contact of said leading edges of said groups of clutch teeth during engaging movement of said groups of clutch teeth to move said pilot tooth against said biasing means from said normal position to a position in pitch and to relatively rotate said clutch means to align said groups of clutch teeth for meshing engagement prior to engagement of said leading edges of said groups of clutch teeth.

18. In a transmission drive device, input clutch means rotatably mounted about an axis including a group of input clutch teeth located about said axis, output clutch means rotatably mounted about said axis including a group of output clutch teeth located about said axis, means mounting said input and output clutch means for relative axial movement between an engaged and a disengaged position, each of said groups of clutch teeth having leading edges aligned in a plane perpendicular to said axis and having substantially the same pitch for simultaneous entry into intermeshing engagement, said groups of clutch teeth being axially spaced from each other in said disengaged position of said input and output clutch means and relatively axially movable toward each other's leading edges for simultaneous intermeshing engagement with each other to enter the engaged position of said input and output clutch means, pilot tooth means on one clutch means having a number of teeth about one and greatly less than the number of teeth in each of said groups located closely together to substantially prevent locking engagement of said pilot tooth means with the group of clutch teeth on the other clutch means, means mounting said pilot tooth means on said one clutch means for movement relative to the remaining teeth of said one group of clutch teeth from a normal position out of pitch with respect to said remaining teeth to a position in pitch with said remaining teeth, biasing means operable to move said pilot tooth means to said normal position when said members are disengaged, and means on said pilot tooth means and said group of clutch teeth on said other clutch means operative to move said pilot tooth means against said biasing means from said normal position to said position in pitch during relative axial movement of said groups of clutch teeth from the disengaged toward the engaged position to relatively rotate said groups of clutch teeth into aligned position for meshing engagement prior to meshing engagement.

19. In a transmission drive device, input clutch means rotatably mounted about an axis including a group of input clutch teeth located about said axis, output clutch means rotatably mounted about said axis including a group of output clutch teeth located about said axis, means mounting said input and output clutch means for relative axial movement between an engaged and a disengaged position, each of said groups of clutch teeth having leading edges aligned in a plane perpendicular to said axis and having substantially the same pitch for simultaneous entry into intermeshing engagement, said groups of clutch teeth being axially spaced from each other in said disengaged position of said input and output clutch means and relatively axially movable toward each other's leading edges for simultaneous intermeshing engagement with each other to enter the engaged position of said input and output clutch means, pilot tooth means on one clutch means, said other clutch means also including intermeshing means located to cooperate with said pilot tooth means, said pilot tooth means having a number of teeth about one and greatly less than the number of teeth in each of said groups located closely together to substantially prevent locking engagement of said pilot tooth means with the group of clutch teeth on the other clutch means, means mounting said pilot tooth means on said one clutch means for movement relative to the remaining teeth of said one group of clutch teeth from a normal position out of pitch with respect to said remaining teeth to a position in pitch with said remaining teeth, biasing means operable to move said pilot tooth means to said normal position when said members are disengaged, and means on said pilot tooth means and said intermeshing means on the other clutch means operative to move said pilot tooth means against said biasing means from said normal position to said position in pitch during relative axial movement of said groups of clutch teeth from the disengaged toward the engaged position to relatively rotate said groups of clutch teeth into aligned position for meshing engagement prior to meshing engagement.

20. In a transmission drive device, input clutch means including a group of input clutch teeth, output clutch means including a group of output clutch teeth, means mounting said input and output clutch means for relative movement between an engaged and a disengaged position, said groups of clutch teeth each constituting a plurality of clutch teeth having substantially the same pitch and leading edges facing each other for intermeshing engagement and being spaced from each other in the disengaged position of said input and output clutch means and said groups of clutch teeth being relatively movable toward each other's leading edge and into intermeshing engagement with each other in the engaged position of said input and output clutch means, the leading edges of the clutch teeth of each of said groups of clutch teeth being aligned on a perpendicular to said direction of movement into said engaged position for simultaneous intermeshing engagement, only one of the clutch teeth of one of said groups of clutch teeth on one clutch means constituting a movable pilot tooth, means mounting said movable pilot tooth on said one clutch means for relative movement with respect to the remaining teeth of said one of said groups of clutch teeth from a normal position out of pitch with respect to said remaining teeth and forward of the leading edge of said remaining clutch teeth toward the leading edge of the other group of clutch teeth to a position in pitch with said remaining teeth and with the leading edge of said pilot tooth less forward of the leading edges of said remaining teeth of said one group of clutch teeth, biasing means operable to move said pilot tooth to said normal position when said members are disengaged, and means operative between a tooth of said other group of clutch teeth and said pilot tooth to move said pilot tooth against said biasing means from said normal position to said position in pitch to relatively rotate said clutch members to align the groups of clutch teeth for simultaneous engagement during relative movement of said groups of clutch teeth from the disengaged toward the engaged position.

21. In a transmission drive device, input clutch means including a group of input clutch teeth, output clutch means including a group of output clutch teeth, means mounting said input and output clutch means for relative movement between an engaged and a disengaged position, said groups of clutch teeth each constituting a plurality of clutch teeth having substantially the same pitch and leading edges facing each other for intermeshing engagement and being spaced from each other in the disengaged position of said input and output clutch means and said groups of clutch teeth being relatively movable toward each other's leading edge and into simultaneous intermeshing engagement in the engaged position of said input and output clutch means, the leading edges of the clutch teeth of each of said groups of clutch teeth being located in a row transverse to said direction of movement into said engaged position and each tooth of each group engaging substantially simultaneously, pilot tooth means having a number of teeth about one tooth and very few compared to the number of teeth in said groups of clutch teeth located closely together to prevent locking during engagement on one clutch means, said other clutch means also including intermeshing means, means mounting said movable pilot tooth on said one clutch means for relative movement with respect to said one clutch means from a normal position to an in-pitch position, biasing means operable to move said pilot tooth to said normal position when said members are disengaged, and means operative between said pilot tooth and said intermeshing means of the other clutch means before contact of said leading edges of said groups of clutch teeth during engaging movement of said groups of clutch teeth to move said pilot tooth against said biasing means from said normal position to said in-pitch position and to relatively rotate said clutch means to align said groups of clutch teeth for simultaneous meshing engagement prior to engagement of said leading edges of said groups of clutch teeth.

References Cited in the file of this patent

UNITED STATES PATENTS

| | | |
|---|---|---|
| 694,784 | Ramsay | Mar. 4, 1902 |
| 2,259,527 | Manville | Oct. 21, 1941 |
| 2,410,643 | Fielding | Nov. 5, 1946 |
| 2,665,788 | Hughes | Jan. 12, 1954 |
| 2,762,477 | Zenner | Sept. 11, 1956 |
| 2,821,277 | Hughes | Jan. 28, 1958 |

FOREIGN PATENTS

| | | |
|---|---|---|
| 711,201 | Great Britain | June 30, 1954 |